US012594688B2

(12) United States Patent
Hara

(10) Patent No.: US 12,594,688 B2
(45) Date of Patent: Apr. 7, 2026

(54) RECYCLED BOARD MANUFACTURING METHOD AND RECYCLED BOARD

(71) Applicant: WORKSTUDIO CORPORATION, Tokyo (JP)

(72) Inventor: Kazuhiro Hara, Tokyo (JP)

(73) Assignee: WORKSTUDIO CORPORATION, Tokai (JP)

( * ) Notice: Subject to any disclaimer, the term of this patent is extended or adjusted under 35 U.S.C. 154(b) by 0 days.

(21) Appl. No.: 18/021,338

(22) PCT Filed: Jun. 1, 2021

(86) PCT No.: PCT/JP2021/020844
§ 371 (c)(1),
(2) Date: Feb. 14, 2023

(87) PCT Pub. No.: WO2022/254576
PCT Pub. Date: Dec. 8, 2022

(65) Prior Publication Data
US 2023/0256647 A1 Aug. 17, 2023

(51) Int. Cl.
*B27N 3/04* (2006.01)

(52) U.S. Cl.
CPC .................................... *B27N 3/04* (2013.01)

(58) Field of Classification Search
CPC ................................. B27N 3/04; B29C 70/12
See application file for complete search history.

(56) References Cited

U.S. PATENT DOCUMENTS 3,110,299 A 11/1963 Fox et al.
5,055,339 A * 10/1991 Eder .................. B29C 44/0446 428/317.1
5,525,387 A * 6/1996 Rossi ...................... B29C 70/30 428/36.1
5,879,802 A 3/1999 Beard et al.
6,379,815 B1 4/2002 Kusters
10,988,874 B2 4/2021 Samsoe et al.
(Continued)

FOREIGN PATENT DOCUMENTS

BE 590389 A 9/1960
CA 2234252 A1 11/1996
(Continued)

OTHER PUBLICATIONS

International Search Report and Written Opinion for Application No. PCT/JP2021/020844, dated Aug. 24, 2021.
(Continued)

*Primary Examiner* — Andrew D Graham
(74) *Attorney, Agent, or Firm* — MARSHALL, GERSTEIN & BORUN LLP

(57) ABSTRACT

A recycled board manufacturing method including a fibrous material generation process of generating a fibrous material by grinding recovered goods containing fibers into a fiber form, an adhesive application process of applying an adhesive having thermosetting properties to the fibrous material generated in the fibrous material generation process, a molding process of molding the fibrous material applied with the adhesive in the adhesive application process into a board shape, and a pressing-heating process of pressing and heating the fibrous material molded into the board shape in the molding process.

8 Claims, 13 Drawing Sheets

B

(56) References Cited

U.S. PATENT DOCUMENTS

| | | | | |
|---|---|---|---|---|
| 2004/0108042 | A1* | 6/2004 | Affentranger | B27N 5/00 156/336 |
| 2004/0187998 | A1* | 9/2004 | Okuzawa | B27N 1/00 156/62.4 |
| 2007/0181035 | A1* | 8/2007 | Wantling | C08L 97/02 106/272 |
| 2009/0233104 | A1* | 9/2009 | Fan | B27N 3/12 428/430 |
| 2010/0021715 | A1* | 1/2010 | Kondo | B29C 48/86 264/45.3 |
| 2010/0310893 | A1* | 12/2010 | Derbyshire | B32B 21/02 524/13 |
| 2016/0215421 | A1* | 7/2016 | Samsøe | B29C 70/46 |
| 2017/0165876 | A1 | 6/2017 | Goh et al. | |
| 2017/0320287 | A1 | 11/2017 | Galle | |
| 2018/0099489 | A1* | 4/2018 | Koshcheeva | B32B 9/043 |
| 2019/0111654 | A1* | 4/2019 | Izawa | B32B 5/024 |
| 2020/0331254 | A1* | 10/2020 | Udding | B32B 21/02 |
| 2021/0354344 | A1* | 11/2021 | Chen | B32B 15/20 |
| 2023/0002524 | A1* | 1/2023 | Slivensky | B29C 48/21 |

FOREIGN PATENT DOCUMENTS

| | | | |
|---|---|---|---|
| CN | 102310453 | | 1/2012 |
| CN | 107206734 | A | 9/2017 |
| CN | 112638998 | A | 4/2021 |
| DE | 29605878 | U1 | 9/1996 |
| DE | 19739486 | A1 | 3/1998 |
| DE | 69805317 | T2 | 11/2002 |
| DE | 202020104647 | U1 | 11/2020 |
| EP | 0338047 | A1 | 10/1989 |
| EP | 0833729 | A1 | 4/1998 |
| EP | 3049563 | A1 | 8/2016 |
| EP | 3396059 | A1 | 10/2018 |
| EP | 3778220 | A1 | 2/2021 |
| JP | S38-20389 | | 10/1963 |
| JP | S57-049600 | B2 | 10/1982 |
| JP | H08-173206 | A | 7/1996 |
| JP | H10-273817 | A | 10/1998 |
| JP | 2002-178848 | A | 6/2002 |
| JP | 2003-201657 | A | 7/2003 |
| JP | 2003-245933 | A | 9/2003 |
| JP | 2004-025857 | A | 1/2004 |
| JP | 3790749 | B2 | 6/2006 |
| JP | 3935815 | B2 | 6/2007 |
| JP | 2014-076588 | A | 5/2014 |
| JP | 2015-223782 | A | 12/2015 |
| JP | 6530551 | B2 | 6/2019 |
| KR | 20170069560 | A | 6/2017 |
| KR | 10-2017-0114682 | A | 10/2017 |
| WO | WO-89/03291 | A1 | 4/1989 |
| WO | WO-96/37355 | A1 | 11/1996 |
| WO | WO-01/32405 | A1 | 5/2001 |
| WO | WO-2013/106302 | A1 | 7/2013 |
| WO | WO-2015/011640 | A1 | 1/2015 |
| WO | WO-2015/044894 | A1 | 4/2015 |
| WO | WO-2019/209165 | A1 | 10/2019 |

OTHER PUBLICATIONS

Office Action issued in Chinese Patent Application No. 202180075990.3 dated Mar. 13, 2024.

Office Action issued in Japanese Patent No. 7254401 dated Nov. 7, 2023.

Communication pursuant to Rule 114(2) EPC issued in European Patent Application No. 21944082.3 dated Jan. 19, 2024.

Supplementary European Search Report issued in European Patent Application No. 21944082 dated Jan. 17, 2024.

European Patent Application No. 21944082.3, Third Party Observations, dated Oct. 24, 2024.

Third Party Observations issued in European Patent Application No. 201944082.3 dated Jan. 15, 2026.

Qu et al., Potential Use of Waste Cotton in Production of Biomass Composites, bioresources 14(4), pp. 8424-8438 (2019).

Third Party Observation issued in European Patent Applicaton No. 21944082.3 dated Jan. 20, 2026.

* cited by examiner

F8

RECYCLED BOARD MANUFACTURING METHOD AND RECYCLED BOARD

TECHNICAL FIELD

Technology disclosed herein relates to a recycled board manufacturing method and to a recycled board.

BACKGROUND ART

A manufacturing method for manufacturing a wood substitute material is disclosed in Japanese Patent Application Laid-Open (JP-A) No. 2004-25857. In this manufacturing method a fibrous material is generated by using a rag tearing machine on waste textiles, then after intertwining the fibrous material with thermoplastic resin fibers, subjecting them to heating and pressing so as to manufacture the wood substitute material.

SUMMARY OF INVENTION

Technical Problem

In the manufacturing method of JP-A No. 2004-25857, a thermoplastic resin (for example polypropylene) is employed as a binder, and the surface of the wood substitute material manufactured thereby is accordingly liable to being shiny.

Moreover, a rag tearing machine is employed in the manufacturing method of JP-A No. 2004-25857 to generate the fibrous material from textiles. A rag tearing machine uses needle shaped members to tease apart textiles, and so the fibrous material generated thereby tends to have a long average fiber length. A wood substitute material having a rough texture is manufactured when a fibrous material having a long average fiber length is employed.

In consideration of the above circumstances, an object of the technology disclosed herein is to obtain a recycled board having excellent styling properties.

Solution to Problem

A recycled board manufacturing method of the present disclosure includes a fibrous material generation process of generating a fibrous material by grinding recovered goods containing fibers into a fiber form, an adhesive application process of applying an adhesive having thermosetting properties to the fibrous material generated in the fibrous material generation process, a molding process of molding the fibrous material applied with the adhesive in the adhesive application process into a board shape, and a pressing-heating process of pressing and heating the fibrous material molded into the board shape in the molding process.

A recycled board of the present disclosure is formed including fibers of leather having an average fiber length no greater than 10 mm and an adhesive having thermosetting characteristics.

A recycled board of the present disclosure is formed including natural fibers having an average fiber length no greater than 10 mm, synthetic fibers having an average fiber length no greater than 10 mm, and an adhesive having thermosetting characteristics.

Advantageous Effects

The technology disclosed herein enables a recycled board with excellent styling properties to be obtained.

DESCRIPTION OF EMBODIMENTS

Explanation follows regarding an example of a recycled board manufacturing method according to an exemplary embodiment, with reference to the drawings.

Figure 1:
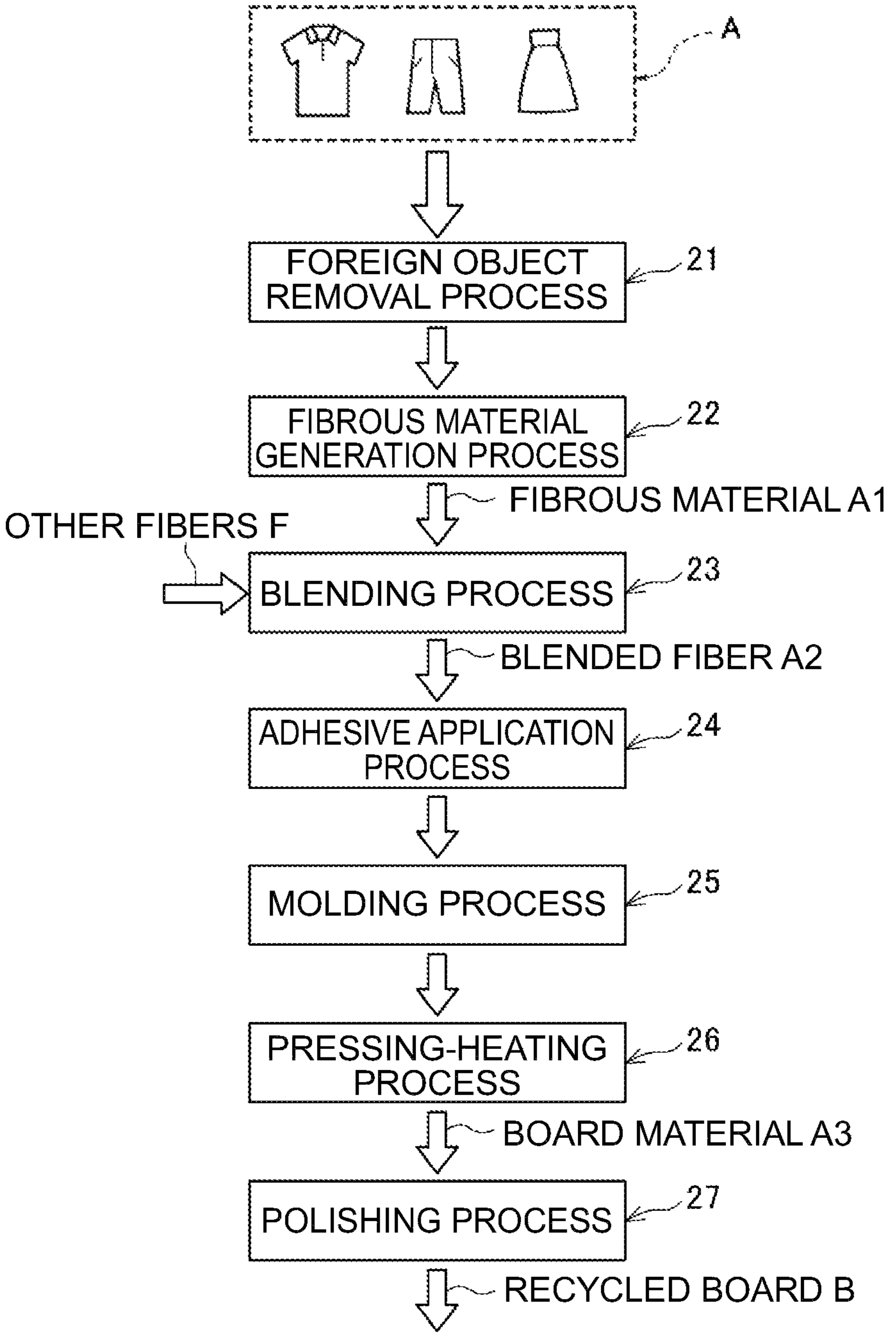
FIG. 1 is a block diagram illustrating a manufacturing method of a recycled board according to an exemplary embodiment.

The recycled board manufacturing method according to the present exemplary embodiment (see FIG. 1) is an example of a method for manufacturing a recycled board B employing recovered goods A containing fibers. The present manufacturing method, for example as illustrated in FIG. 1, includes a foreign object removal process 21, a fibrous material generation process 22, a blending process 23, an adhesive application process 24, a molding process 25, a pressing-heating process 26, and a polishing process 27. Explanation follows regarding the recovered goods A and each of the processes in the present manufacturing method.

Recovered Goods A

The recovered goods A are goods collected from collectors such as consumers and businesses. Specifically, the recovered goods A are, for example, goods not wanted by the collectors, and are goods collected for the purpose of recycling. Textiles are an example of the recovered goods A.

Examples of textiles as the recovered goods A include not only clothes, but also products such as towels, sheets, and curtains, as well as cloth and thread that are materials for such products and clothes. Thus any cloth or thread, or any goods formed from cloth or thread may be employed as the textiles.

The types of fibers in textiles is not particularly limited, and various types may be employed therefor. Examples of the types of such fibers include natural fibers and chemical fibers. Examples of natural fibers include plant fibers such as cotton and linen, and animal fibers such as silk, wool, and cashmere. Examples of chemical fibers include synthetic fibers such as nylon, polyester, acrylic, and polyurethane, recycled fibers such as rayon, and half synthetic fibers such as acetate.

In addition to textiles one or more paper product may be included as the recovered goods A, for example wrapping paper for wrapping textiles, corrugated cardboard for packing textiles, or paper tubes wound with a textile cloth.

Leathers may be included in addition to textiles as the recovered goods, for example natural leathers such as cow hides, synthetic leathers, or artificial leathers. Articles employed as leather include, for example, purses, bags, baseball gloves, jackets, and the like.

Foreign Object Removal Process 21

The present process is a process to remove foreign objects from the recovered goods A. Examples of foreign objects include accessories attached to the recovered goods A, such as buttons, fasteners, and the like. Moreover, examples of foreign objects also include objects formed from a material (for example a metal or a resin) that does not include fibers. Note that the present process does not need to be executed for cases in which there are no foreign objects in the recovered goods A.

Fibrous Material Generation Process 22

The present process generates a fibrous material A1 by grinding the recovered goods A, from which foreign objects have been removed, into a fiber form. Specifically, the present process generates the fibrous material A1 by employing a grinder to grind the recovered goods A to the level of fibers. Note that "grinding into a fiber form" refers to grinding until at least a cloth state (for example, a woven state or a knitted state), or a thread state (for example a twisted state), has been eliminated.

Moreover, "grinding" is specifically, for example, grinding by cutting up the recovered goods A using a cutter, and differs from breaking up the recovered goods A using a machine that includes needle shaped members (for example a rag tearing machine).

Moreover, in cases in which plural types out of the above textiles, leathers, or paper products are employed as the recovered goods A, then the fibrous material A1 can be generated by grinding these plural types all together.

Note that the present process may be any process including grinding the recovered goods A. Therefore the present process may, for example, be performed by grinding the recovered goods A after breaking up the recovered goods A using a rag tearing machine.

Moreover, in the present process preferably the fibrous material A1 is generated by grinding the recovered goods A so as to give an average fiber length of no greater than 10 mm.

There are the following concerns (1) to (4) regarding cases in which there is a long average fiber length of the fibrous material A1 generated by the present process (for example, cases in which the average fiber length exceeds 10 mm).

(1) Degradation to a process of blending the fibrous material A1 and an adhesive together.

(2) Degradation to a process of blending the fibrous material A1 with other fibers F, described later.

(3) Degradation to a process of blending plural types of fiber together in cases in which the fibrous material A1 contains plural types of fiber.

(4) A rough texture on the surface of a recycled board B and degradation to styling properties.

Note that in the present process, for example, the recovered goods A may be ground until the average fiber length of the fibrous material A1 is a length in a range exceeding 10 mm but less than 20 mm. Namely, the recycled board manufacturing method according to the present exemplary embodiment does not exclude grinding the recovered goods A so as to give an average fiber length of the fibrous material A1 exceeding 10 mm.

Moreover, from the perspective of above concerns (1) to (4), the average fiber length of the fibrous material A1 generated by the present process is preferably no greater than 8 mm, and is more preferably no greater than 3 mm.

Note that the size of patterning on the surface of the recycled board B can be adjusted using the average fiber length of the fibrous material A1. Thus in cases in which there is a desire to realize a comparatively course patterning on the surface of the recycled board B, the average fiber length of the fibrous material A1 may, for example, be of the order of from 7 mm to 8 mm, and in cases in which there is a desire to realize a comparatively fine patterning, the average fiber length of the fibrous material A1 may, for example, be of the order of from 2 mm to 3 mm.

Moreover, the average fiber length of the fibrous material A1 generated in the present process is, for example, no less than 0.5 mm.

When the average fiber length of the fibrous material A1 generated in the present process is less than 0.5 mm then there is less intertwining between fibers, leading to concerns regarding a reduction in the mechanical strength of the recycled board B. Note that even when the average fiber length of the fibrous material A1 is less than 0.5 mm, the mechanical strength of the recycled board B can be raised by adjusting the type of adhesive and amount employed thereof in the adhesive application process 24, or by adjusting the pressing and heating in the pressing-heating process 26. Accordingly, the average fiber length of the fibrous material A1 generated in the present process may, for example, be less than 0.5 mm.

Note that the average fiber length may, for example, be measured by a method conforming to JIS P8226 (Automated Optical Analysis). The average fiber length is, specifically, a number average fiber length. Note that the average fiber length may also be a length weighted average fiber length.

Blending Process 23

In the present process the other fibers F are blended with the fibrous material A1 generated by the fibrous material generation process 22. An example of the other fibers F is wood fibers or the like. The resultant from blending the other fibers F with the fibrous material A1 is referred to below as blended fibers A2. The average fiber length of the other fibers F is, for example, similar to the average fiber length of the fibrous material A1.

The recycling efficiency is higher as the mass ratio of the fibrous material A1 with respect to the other fibers F is raised. For example, depending on the fibers employed as the fibrous material A1 and the other fibers F, the strength of the recycled board B can be made higher by raising the mass ratio of the other fibers F with respect to the fibrous material A1.

Thus in the recycled board B, the mass ratio of the fibrous material A1 in the recycled board B is set according to the recycling efficiency demanded and strength of the recycled board B demanded. Specifically, the mass ratio of the fibrous material A1 in the recycled board B (in this case the mass ratio excluding adhesive) may be set in a range of, for example, from 50% to 99%. Note that as long as the fibrous material A1 is included in the recycled board B, the mass ratio in the recycled board B (in this case the mass ratio excluding adhesive) may also be set in a range of, for example, from 1% up to, but not including, 50%.

Note that the mass ratio of the fibrous material A1 in the recycled board B (in this case the mass ratio excluding adhesive) may also be 100%. In such cases there are no other fibers F blended therein, and so the blending process 23 is not executed. Thus the blending process 23 does not need to be executed in the present manufacturing method.

Adhesive Application process 24

In the present process an adhesive having thermosetting properties is applied to the blended fibers A2. In the present process an adhesive is employed that will harden by the pressing-heating process 26. Note that in cases in which the blending process 23 is not executed, the present process is applying an adhesive having thermosetting properties to the fibrous material A1.

The adhesive employed may include, for example, an adhesive containing an organic isocyanate compound. Examples of such organic isocyanate compounds include 4,4'-diphenylmethane diisocyanate, polymethylene polyphenylene polyisocyanate, 2,4-tolylene diisocyanate, 2,6-tolylene diisocyanate, xylene-1,4-diisocyanate, xylene-1,3-diisocyanate, 2,4'-diphenylmethane diisocyanate, 2,2'-diphenylmethane diisocyanate, and 4,4'-diphenylether diisocyanate.

Note that a known adhesive containing any resin from out of a urea resin, a melamine resin, a phenol resin, an epoxy resin, or the like may be employed as this adhesive. Moreover, the adhesive may, for example, be an adhesive formed from 100% natural raw materials.

The adhesive is, for example, applied to the blended fibers A2 in a liquid state using an application method such as spraying. Specifically, in the present process, for example, the adhesive is applied by spraying while blending the blended fibers A2 in a blender.

The application amount of the adhesive is, for example, preferably from 2 parts by mass to 15 parts by mass, wherein the mass of the blended fibers A2 (the fibrous material A1 in cases in which the blending process 23 is not executed) is 100 parts by mass.

There is a concern regarding a drop in the mechanical strength of the recycled board B when the application amount of the adhesive is less than 2 parts by mass, wherein the mass of the blended fibers A2 (the fibrous material A1 in cases in which the blending process 23 is not executed) is 100 parts by mass.

However, the mass ratio occupied by the blended fibers A2 in the recycled board B falls in cases in which the application amount of the adhesive exceeds 15 parts by mass, wherein the mass of the blended fibers A2 (the fibrous material A1 in cases in which the blending process 23 is not executed) is 100 parts by mass. This leads to a fall in the recycling efficiency.

Molding Process 25

In the present process, the blended fibers A2 applied with adhesive in the adhesive application process 24 are molded into a board shape (namely, a mat shape). In the present process, for example, the board shape resulting from molding the blended fibers A2 applied with adhesive into a board shape can be arranged in a multi-board stack.

In the present process, for example, the blended fibers A2 applied with adhesive can be molded into a board shape by housing the blended fibers A2 in a box shaped container with open top face.

Moreover, in the present process, for example a dry method may be employed to mold the blended fibers A2 into a board shape using airflow. Note that a wet method may also be employed for molding the blended fibers A2 into a board shape using water as a medium.

Note that in cases in which the blending process 23 is not executed, the present process is molding the fibrous material A1 applied with adhesive into a board shape (namely, a mat shape).

Pressing-Heating Process 26

In the present process, the blended fibers A2 molded into a board shape at molding process 25 are pressed and heated. Specifically, in the present process heating is performed while pressing. Note that in the present process heating may, for example, be performed after pressing. Moreover, the present process may include pressing, followed by heating while pressing.

The adhesive is hardened by the present process. The fibers are bonded together thereby, and a board material A3 is formed. The board material A3 has a thickness controlled so as to be a board thickness arising from adding an allowance needed for polishing to the thickness of the recycled board B as a final product.

Note that in cases in which the blending process 23 is not executed, it is the fibrous material A1 molded into a board shape that is heated and pressed.

Polishing Process 27

Figure 2:
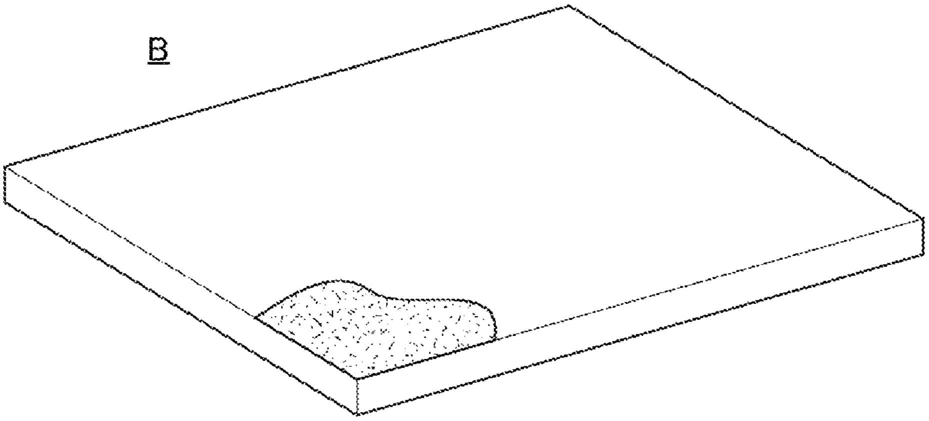
FIG. 2 is a perspective view illustrating an example of manufactured recycled board.

In the present process, the surface of the board material A3 formed in the pressing-heating process 26 is polished. This concludes manufacturing of the final product recycled board B. The recycled board B has, as illustrated in FIG. 2, a maximum board thickness of about 30 mm, and is a rectangular shaped board having a board surface area from which to cut out furniture parts efficiently. Note that the board thickness, board surface area, and board shape of the recycled board B are each determined according to the application. Note that the polishing process 27 does not need to be executed in the present manufacturing method.

Note that the recycled board B can be manufactured using, in each of the above processes, methods conforming to manufacturing methods employed to manufacture medium density fiberboard (MDF). Moreover, the recycled board B can be manufactured using methods conforming to manufacturing methods employed to manufacture particle board, hardboard (high density fiberboard), or insulation board (soft fiberboard) in each of the above processes.

Applications for Recycled Board B

As described below, furniture can be manufactured using the recycled board B. Specifically, parts cut out in prescribed shapes from the recycled board B may be furniture parts employed to manufacture furniture for use in the home or shops by themselves, or may be employed to manufacture furniture for use in the home or shops by combining these furniture parts together with other parts. Reference here to furniture is a general term used for furniture, equipment, articles, and the like for use in the home or shops.

Examples of the furniture include a table F1 (FIG. 3), a hanger F2 (FIG. 4), a torso F3 (FIG. 5), a display rack F41 (FIG. 6), a display rack F42 (FIG. 7), a display rack F43 (FIG. 8), a panel stand F5 (FIG. 9), partitions F6 (FIG. 10), cube staging F7 (FIG. 11), a sign board F8 (FIG. 12), a folding screen F9 (FIG. 13), and the like. Moreover, the furniture also includes a pallet to display goods for sale, a chair, and the like.

Figure 3:
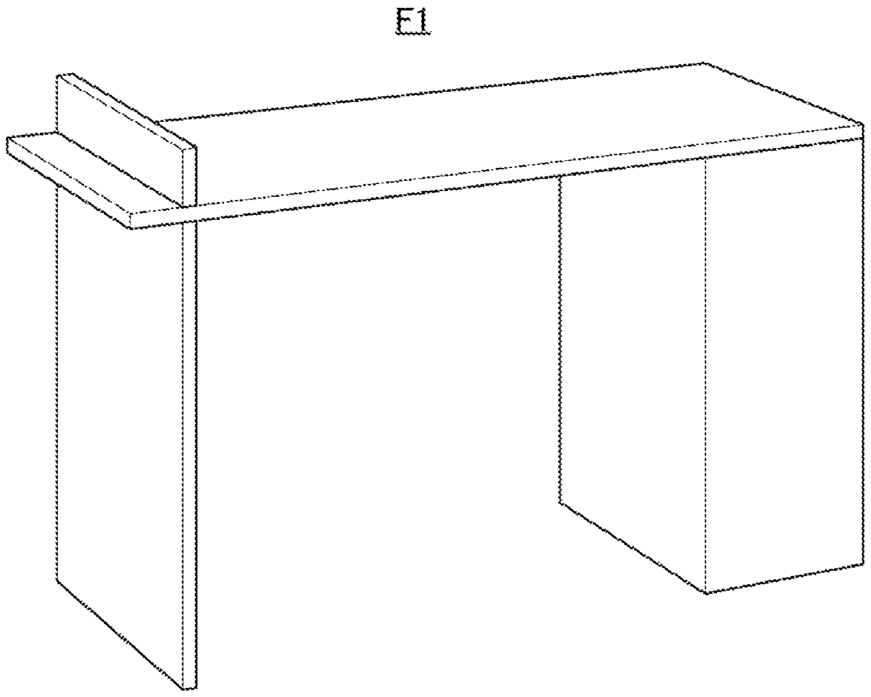
FIG. 3 is a perspective view illustrating an example of a table made using recycled board.

As illustrated in FIG. 3, the table F1 has a countertop that is the table surface and one leg (on the left side in the drawing) made from the recycled board B, and the other leg (on the right side in the drawing) is made from an acrylic resin material.

Figure 4:
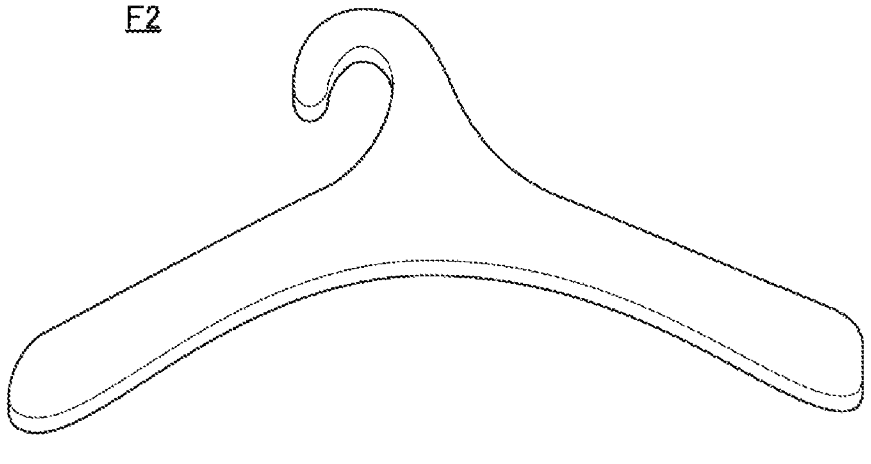
FIG. 4 is a perspective view illustrating an example of a hanger made using recycled board.

As illustrated in FIG. 4, the hangar F2 is made from a single furniture part that has been cut out from the recycled board B.

Figure 5:
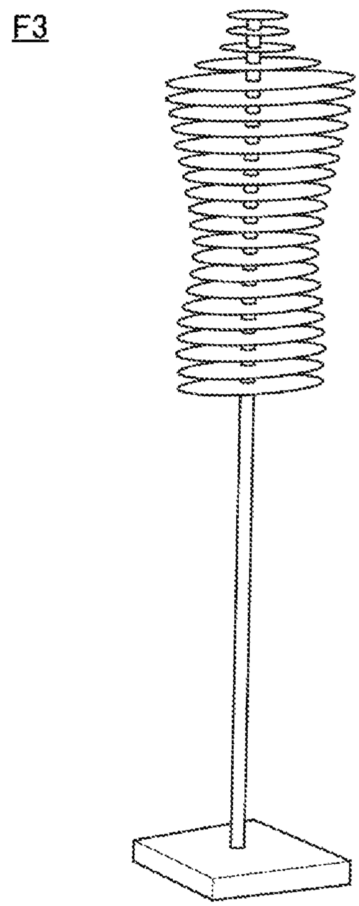
FIG. 5 is a perspective view illustrating an example of a torso made using recycled board.

As illustrated in FIG. 5, the torso F3 has a base and support column made from an acrylic resin material, and a display body (torso) made from the recycled board B. The body is made from plural sheets of furniture parts that have been cut out from the recycled board. B so as to each differ slightly in shape, with the plural furniture parts arranged on the support column as layers (plural layers).

Figure 6:
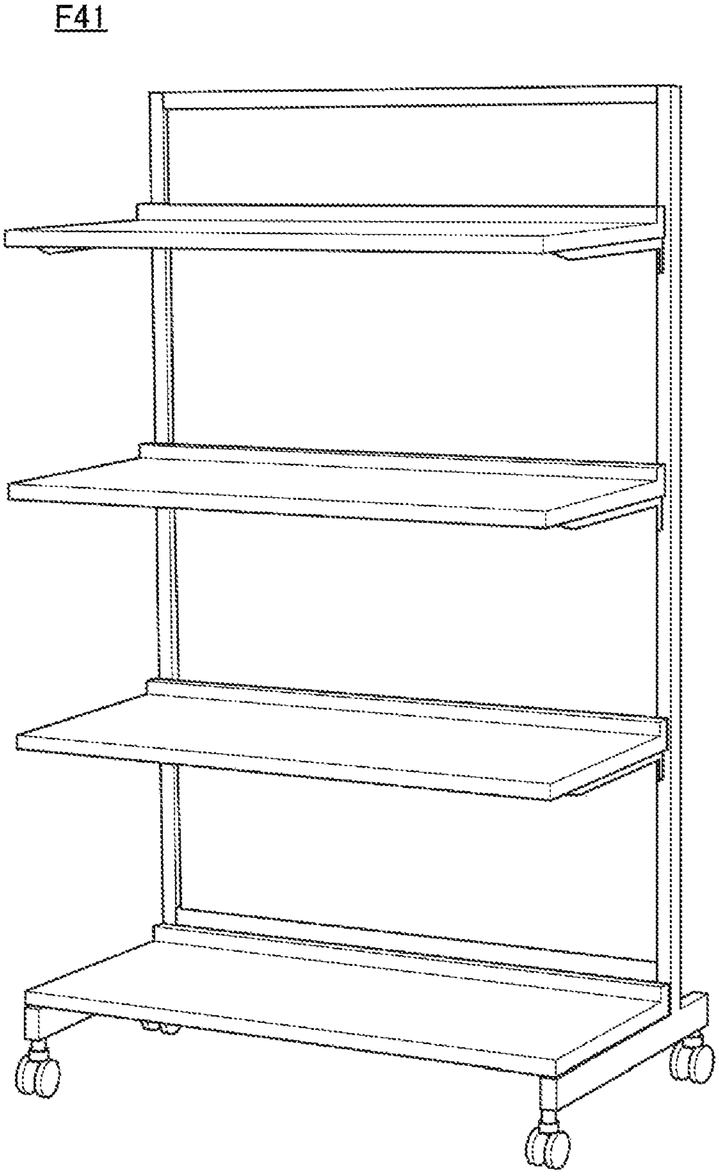
FIG. 6 is a perspective view illustrating an example of a display rack made using recycled board.
Figure 7:
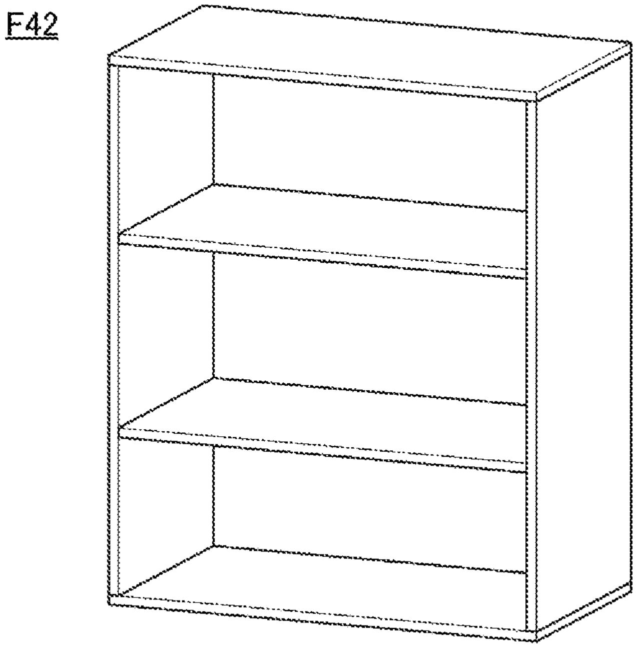
FIG. 7 is a perspective view illustrating an example of a display rack made using recycled board.
Figure 8:
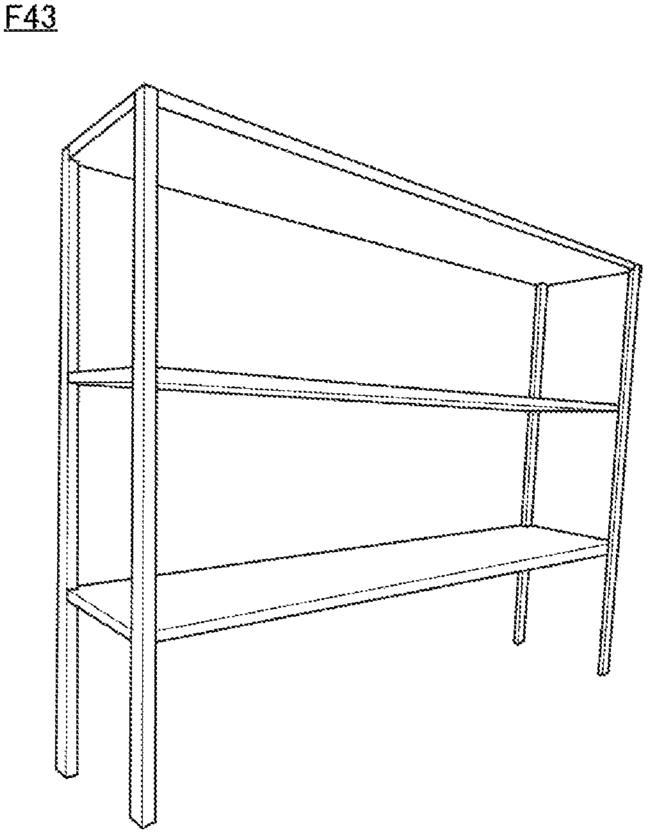
FIG. 8 is a perspective view illustrating an example of a display rack made using recycled board.

As illustrated in FIG. 6, the display rack F41 includes a shelf base and a shelf frame made from a metal material, and shelves and a back board made from the recycled board B. As illustrated in FIG. 7, the display rack F42 is made by combining recycled boards B of the same width both vertically and horizontally. As illustrated in FIG. 8, the display rack F43 includes a rack frame made from a metal material, and shelf boards made from the recycled board B.

Figure 9:
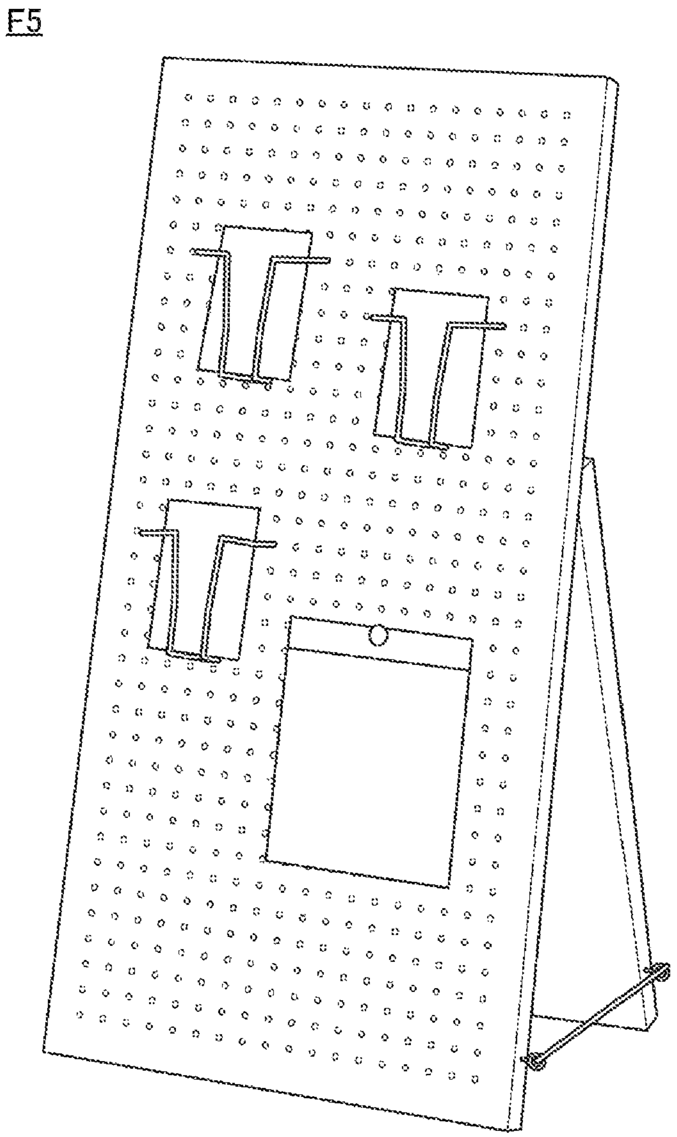
FIG. 9 is a perspective view illustrating an example of a panel stand made using recycled board.

As illustrated in FIG. 9, the panel stand F5 is made by combining a large recycled board B together with a smaller recycled board B, opening plural holes in the large recycled board B, attaching fittings to the holes, and laying out books, pamphlets, and the like.

Figure 10:
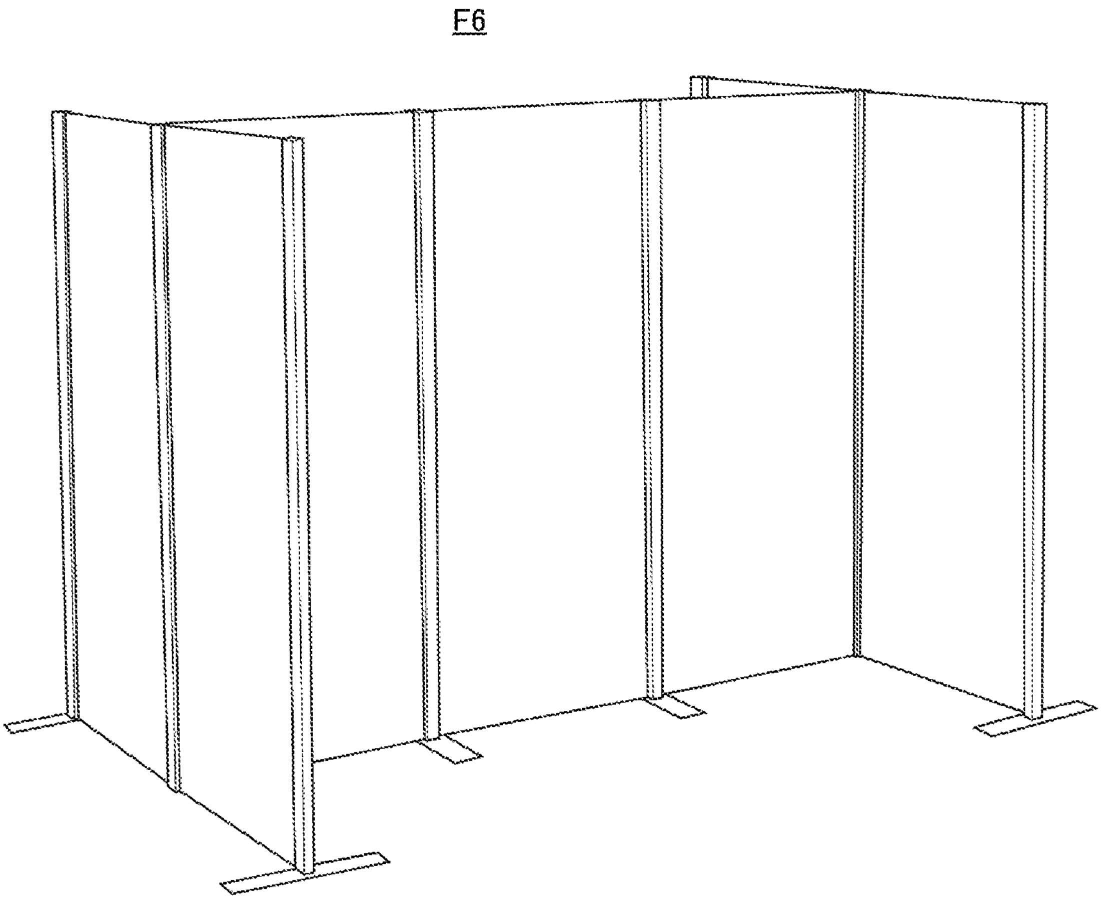
FIG. 10 is a perspective view illustrating an example of partitions made using recycled board.

As illustrated in FIG. 10, the partitions F6 include a partition frame and frame legs formed from a metal material, and partitioning boards made from the recycled board B.

Figure 11:
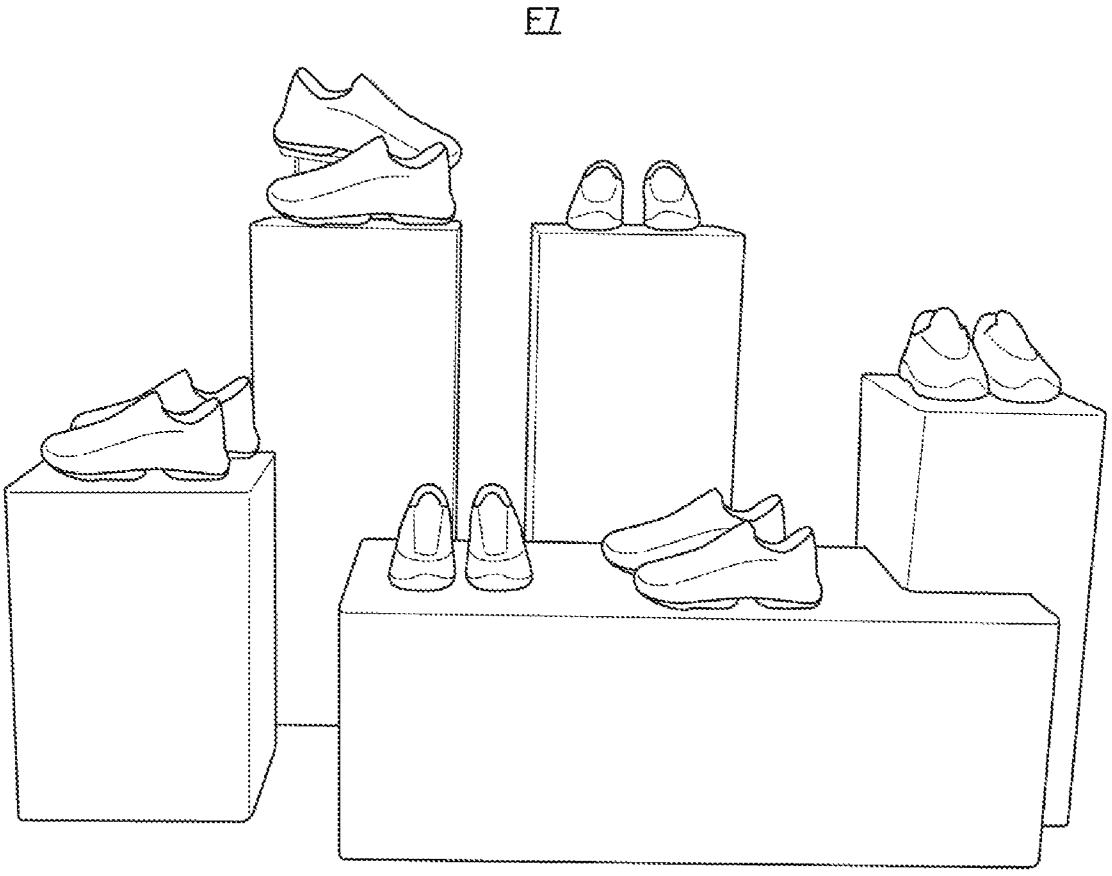
FIG. 11 is a perspective view illustrating an example of cube staging made using recycled board.

As illustrated in FIG. 11, the cube staging F7 includes cubes of varying sizes made from the recycled board B, with the plural cubes arranged for displaying goods for sale (for example shoes).

Figure 12:
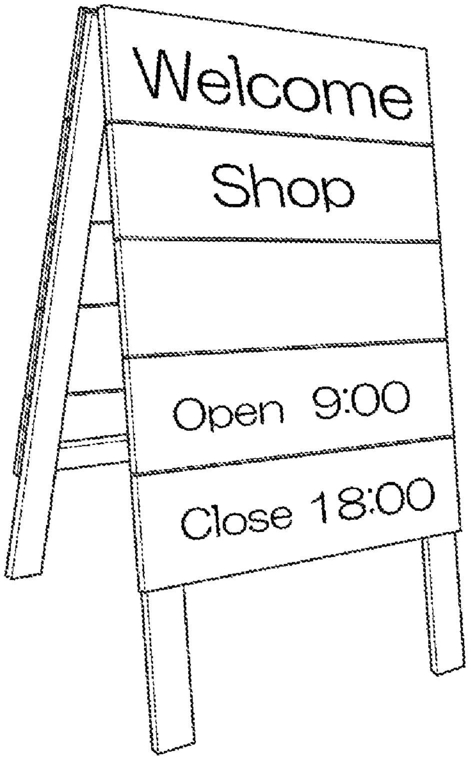
FIG. 12 is a perspective view illustrating an example of a sign board made using recycled board.

As illustrated in FIG. 12, in the sign board F8, a material for a signboard to be placed in front of a shop is made from the recycled board B, instead of being made from a wood sheet material.

Figure 13:
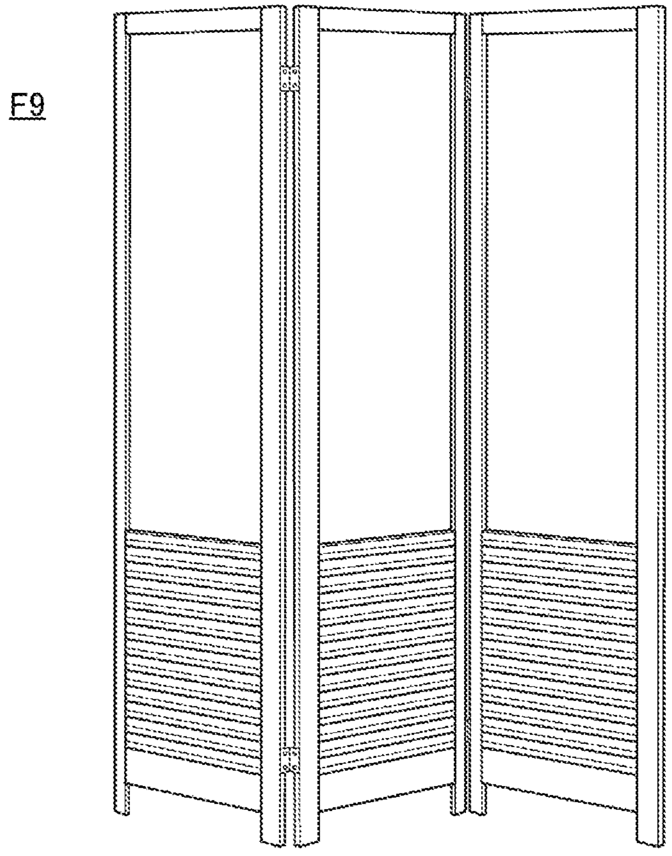
FIG. 13 is a perspective view illustrating an example of a folding screen made using recycled board.

As illustrated in FIG. 13, the folding screen F9 includes folding panels and is made from the recycled board B, except for hinges for connecting these together so as to be foldable.

Note that although some examples have been illustrated of manufacturing furniture for use in the home or shop using the recycled board B, there is no limitation thereto. For example, the recycled board B can be employed for various other applications, such as for construction board, interior decoration boards, boards used for the interior trim of a vehicle cabin, and the like.

Fibrous Material A1 Containing Recycled Board B

Explanation follows regarding the fibrous material A1 and the like contained in the recycled board B manufactured by the present manufacturing method.

Examples of the fibrous material A1 include natural fibers, chemical fibers, and the like. Examples of natural fibers include plant fibers such as cotton and linen, and animal fibers such as silk, wool, and cashmere. Examples of the chemical fibers include synthetic fibers such as nylon, polyester, acrylic, and polyurethane, recycled fibers such as rayon, and half synthetic fibers such as acetate.

The fibrous material A1 contains fibers from a paper product in cases in which, as mentioned above, in addition to textiles one or more paper product, such as wrapping paper, corrugated cardboard, and paper tubes, is employed as the recovered goods A.

Moreover, the fibrous material A1 contains fibers of leather in cases in which, as mentioned above, in addition to textiles leather is also included as the recovered goods A.

In the present exemplary embodiment the recycled board B contains plural types of fiber generated from textiles as the fibrous material A1. Specifically, the recycled board B includes both natural fibers (for example cotton fibers) and synthetic fibers (for example polyester fibers) as the fibrous material A1, and the contained mass of the synthetic fibers is greater than the contained mass of the natural fibers. More specifically, the recycled board B contains both plant fibers and animal fibers as the natural fibers, and the contained mass of the animal fibers is less than the contained mass of the plant fibers. Note that the contained mass of fibers refers to the mass of fibers contained in the recycled board B.

Moreover, in the present exemplary embodiment, the recycled board B contains fibers of plural colors generated from textiles as the fibrous material A1. Specifically, the recycled board B includes first fibers (for example cotton fibers) colored a first color (for example red), second fibers (for example polyester fibers) of a different type to the first fibers and colored a second color (for example blue) different to the first color, and third fibers (for example cotton fibers) the same type as the first fibers and colored a third color (for example green) different to the first color.

Operation and Advantageous Effects According to the Present Exemplary Embodiment A description will now be given regarding the operation and advantageous effects according to the present exemplary embodiment, in comparison to the manufacturing method disclosed in JP-A No. 2004-25857 (hereafter referred to as manufacturing method 100).

A thermoplastic resin (for example polypropylene) is employed as a binder in the manufacturing method 100. In contrast thereto, an adhesive having thermosetting properties is employed as the binder in the manufacturing method of the present exemplary embodiment.

Thus in the manufacturing method 100, the surface of the manufactured wood substitute material is liable to being shiny due to employing the thermoplastic resin (for example polypropylene) as the binder. Moreover, due to a thermoplastic resin re-melting under reheating, the manufactured wood substitute material readily undergoes thermal deformation.

In contrast thereto, the surface of the recycled board B is not liable to become shiny in the manufacturing method of the present exemplary embodiment, due to employing the adhesive having thermosetting characteristics, achieving excellent styling properties. Moreover, this adhesive is not readily melted even under reheating, and so the manufactured recycled board B is not liable to undergo thermal deformation.

Moreover, thermoplastic resin fibers are intertwined as a binder with the fibers obtained from textiles in the manufacturing method 100. In contrast thereto, the adhesive is applied to the blended fibers A2 (to the fibrous material A1 in cases in which the blending process 23 is not executed) in the manufacturing method of the present exemplary embodiment. Thus in the manufacturing method of the present exemplary embodiment, the blended fibers A2 and the adhesive acting as the binder are more readily mixed together uniformly compared to in the manufacturing method 100.

Moreover, the fibrous material is generated from textiles using a rag tearing machine in the manufacturing method 100. In a rag tearing machine, needle shaped members are employed for breaking up the textiles and is liable to result the generated fibrous material having a long average fiber length. In contrast thereto, the fibrous material A1 is generated by grinding the textiles in the manufacturing method of the present exemplary embodiment. Thus in the manufacturing method of the present exemplary embodiment, the average fiber length of the fibrous material A1 tends to be less than in the manufacturing method 100. As a result the following advantageous effects (1) to (4) are obtained.

(1) The fibrous material A1 and the adhesive are readily blended uniformly.

(2) The fibrous material A1 and other fibers F are readily blended uniformly.

(3) In cases in which there are plural types of fiber contained in the fibrous material A1, the plural types of fiber are readily blended together uniformly.

(4) The surface texture of the recycled board B is finer, resulting in excellent styling properties.

Furthermore, in the manufacturing method of the present exemplary embodiment, the above advantageous effects (1) to (4) are better exhibited in cases in which the recovered goods A are ground so as to have an average fiber length of no greater than 10 mm.

Note that in the manufacturing method 100, fibers obtained from the textiles and the thermoplastic resin fibers are intertwined, and so the average fiber length of the fibers is preferably no less than 30 mm. The manufacturing method 100 accordingly adopts a method which employs a rag tearing machine instead of a method of grinding the textiles.

Furthermore, the manufacturing method according to the present exemplary embodiment has the following operation and advantageous effects.

In the present exemplary embodiment, the recovered goods A may include, in addition to textiles, one or more paper product such as wrapping paper for wrapping textiles, corrugated cardboard for packing textiles, or paper tubes wound with textile cloth. In such cases, in the fibrous material generation process 22, the fibrous material A1 is generated by taking the textiles and such paper product, and grinding these into a fiber form all together.

By processing the textiles and such paper product all together, the need to separate textiles and paper product is eliminated, making a separating operation unnecessary, and enabling a reduction in the number of process in the manufacturing processes to manufacture the recycled board B.

Moreover, the recycled board B includes the fibrous material A1 from textiles, and so has superior sound absorption characteristics and insulating characteristics compared to general wood board formed from wood fibers alone.

Moreover, the recycled board B includes natural fibers and synthetic fibers as the fibrous material A1, and the contained mass of synthetic fibers is greater than the contained mass of natural fibers.

In contrast to natural fibers that are usually formed in a twisted shape, synthetic fibers usually have a more linear form than natural fibers. Thus by including natural fibers and synthetic fibers in the recycled board B, the recycled board B has a surface where the natural fibers show, and a surface where the synthetic fibers show, each having microscopically different textures. The microscopic areas of different texture combine to impart superior styling properties to the recycled board B compared to cases in which there is only a single type of fibers contained therein.

Furthermore, the recycled board B is able to exhibit more of the characteristics held by synthetic fibers due to there being a greater contained mass of synthetic fibers than the contained mass of natural fibers.

For example, in contrast to natural fibers that have naturally derived components that are nutritious to molds and insects, synthetic fibers have the property of being less liable to be nutritious to molds and insects than natural fibers. Synthetic fibers have a lower water absorbency than natural fibers.

Moreover, as described above, in the manufacturing method according to the present exemplary embodiment, the natural fibers and the synthetic fibers are readily uniformly blended, and so there is a tendency for the recycled board B as a whole to on average achieve a state in which the contained mass of the synthetic fibers is greater than the contained mass of the natural fibers. Namely, variation is suppressed between the contained mass of synthetic fibers and the contained mass of natural fibers in each of the portions of the recycled board B. As a result the characteristics held by synthetic fibers are exhibited on average across the recycled board B as a whole. Namely, variation in the characteristics exhibited by each portion of the recycled board B is suppressed.

In the textiles normally in circulation, there are often said to be more textiles using synthetic fibers than textiles using natural fibers. Moreover, there are more businesses that handle textiles using synthetic fibers than textiles using natural fibers. Thus there are cases in which there are more textiles using synthetic fibers than textiles using natural fibers as the recovered goods A. In such cases, making the contained mass of the synthetic fibers in the recycled board B greater than the contained mass of the natural fibers eliminates the need to adjust the masses of the fibers contained in the recycled board B, which also eliminates the need to perform fiber classification etc.

Moreover, the recycled board B specifically contains both plant fibers and animal fibers as the natural fibers and has a greater contained mass of plant fibers than the contained mass of animal fibers.

Animal fibers adopt more complicated shapes than plant fibers, such as twisting. Thus due to the recycled board B including, in addition to the synthetic fibers, plant fibers and animal fibers as the natural fibers, the recycled board B has surfaces where the animal fibers show, surfaces where the plant fibers show, and surfaces where the synthetic fibers show, giving rise to microscopically different textures. Combining the microscopic areas of different texture results in the excellent styling properties of the recycled board B.

Moreover, the animal fibers are more liable to deteriorate than plant fibers, and there are cases in which there is discoloration due to such deterioration. Thus due to the contained mass of animal fibers being less than the contained mass of plant fibers, the recycled board B is able to suppress deterioration and discoloration in the recycled board B compared to cases in which the contained mass of animal fibers is greater than the contained mass of plant fibers.

Moreover, the recycled board B includes the first fibers (for example cotton fibers) colored the first color (for example red), the second fibers (for example polyester fibers) of a different type to the first fibers and colored the second color (for example blue) different to the first color, and the third fibers (for example cotton fibers) the same type as the first fibers and colored the third color (for example green) different to the first color.

According to this configuration, due to the second fibers being a different type of fiber and color to the first fibers, portions having both different texture and color appear microscopically on the surface of the recycled board B, and due to the third fibers being the same type of fiber but a different color to the first fibers, portions having the same texture but different color appear microscopically on the surface of the recycled board B. This imparts a variation in texture and color, leading to the excellent styling properties. Note that as long as the third color is different to the first color, the third color may be the same color as the second color, or a different color to the second color.

Note that the surface of the recycled board B is preferably not coated with a resin material or the like. The fibers are exposed on the surface of the recycled board B due to not coating the surface, making it easy to perceive the texture of the fibers at the surface of the recycled board B.

Recovered Goods A—Modified Example

Leathers, including natural leathers such as cow hides, synthetic leathers, and artificial leathers and the like may, for example, be employed as the recovered goods A instead of textiles. Thus a leather may be employed alone as the recovered goods A. A recycled board B containing leather fibers as the fibrous material A1 is manufactured in such cases.

Leathers have fibers that are difficult to tease apart and do not readily attain a cotton-like state, and so use of a rag tearing machine is unsuitable for generating the fibrous material A1. In contrast thereto, in the manufacturing method of the present exemplary embodiment, the fibrous material A1 is generated by grinding the recovered goods A, enabling the fibrous material A1 to be generated even with leather recovered goods A. Thus employing the manufacturing method of the present exemplary embodiment enables the recycled board B to be manufactured from leather.

Goods including fibers derived from a plant, such as coco bean husks, coffee grounds, paper (goods including pulp), and the like may be employed instead of textiles as the recovered goods A. Thus one out of coco bean husks, coffee grounds, or paper (goods including pulp) may be employed as the recovered goods A. The paper referred to here includes the above mentioned paper products as well as pattern paper used in clothing manufacture, and other types of paper.

The recovered goods A may, for example, be goods containing carbon fibers or the like. Moreover, the recovered goods A may, for example, be one or plural items including the above textiles, leathers, paper products, goods containing fibers derived from a plant, or goods containing carbon fibers. Any goods containing fibers may be employed as the recovered goods A.

OTHER MODIFIED EXAMPLES

Although the above recycled board B includes the first fibers, the second fibers, and the third fibers, there is no limitation thereto. The recycled board B may be configured including the first fibers and the third fibers but without the second fibers, or may be configured including the first fibers and the second fibers but without the third fibers. Moreover, the recycled board B may, either instead of or in addition to the third fibers, include fourth fibers (for example rayon fibers) that are a different type of fiber to the first fibers and are colored either the same color (for example red) as the first color or a fourth color in the same color series (for example orange) as the first color. Note that as long as the fourth fibers are a different type of fiber to the first fibers, they may be a different type of fiber to the second fibers, or may be the same type of fiber to the second fibers. Moreover, reference here to the same color series may, for example, be defined as a color having a hue nearer to the hue of the first color compared to the hue of the second color.

Moreover, the recycled board B is not limited to a configuration including plant fibers and animal fibers as the natural fibers and having a contained mass of animal fibers less than the contained mass of plant fibers. The recycled board B may have a contained mass of animal fibers greater than the contained mass of plant fibers. The recycled board B may have a contained mass of animal fibers the same as the contained mass of plant fibers. Moreover, the recycled board B may be configured including one out of plant fibers or animal fibers as the natural fibers, and not including the other thereof.

Moreover, the recycled board B is not limited to including natural fibers and synthetic fibers as the fibrous material A1 and to having a contained mass of synthetic fibers greater than a contained mass of natural fibers. The recycled board B may have a contained mass of natural fibers greater than the contained mass of synthetic fibers.

In such cases, the recycled board B is better able to exhibit characteristics held by natural fibers. Natural fibers have superior water absorbency to synthetic fibers. Thus making the contained mass of the natural fibers greater than the contained mass of synthetic fibers in the recycled board B enables superior water absorbency to that of cases in which the contained mass of natural fibers is less than the contained mass of synthetic fibers, and enables a humidity regulation action to be imparted thereto. Namely, in cases in which the recycled board B is employed as a wall material or the like in a room, the recycled board B can be imparted with a humidity regulation action: absorbing moisture when the room humidity is high and releasing moisture when the room humidity is low. Furthermore, the recycled board B may be set with the same contained mass of natural fibers to the contained mass of synthetic fibers.

Moreover, although the recycled board B includes synthetic fibers for chemical fibers as the fibrous material A1, the recycled board B may, either instead of or in addition thereto, include chemical fibers other than synthetic fibers. Examples of chemical fibers other than synthetic fibers include recycled fibers such as rayon, half synthetic fibers such as acetate, and the like. Thus the recycled board B may be configured to include natural fibers (for example cotton fibers), synthetic fibers (for example polyester fibers), and recycled fibers (for example rayon fibers) as the fibrous material A1, with the contained mass of the natural fibers greater than the contained mass of the recycled fibers and the contained mass of the synthetic fibers greater than the contained mass of natural fibers.

Moreover, although the recycled board B is configured including plural color fibers generated from the recovered goods A as the fibrous material A1, there is no limitation thereto and a configuration containing fibers of a single color may be adopted.

Moreover, although the recycled board B is configured including plural type of fiber generated from the recovered goods A as the fibrous material A1, there is no limitation thereto, and a configuration including a single type of fibers may be adopted. Moreover, the types of fiber contained in recycled board B and the contained masses thereof may be varied according to the application etc.

The present invention is not limited to the exemplary embodiments described above, and various modifications, changes, and improvements are possible within a range not departing from the spirit of the invention. For example, as appropriate, a configuration combining plural of the modified examples described above may be adopted.

The invention claimed is:

1. A recycled board manufacturing method comprising:

a fibrous material generation process of generating a fibrous material by grinding recovered goods containing fibers into a fiber form, wherein the fibrous material generated from the recovered goods includes first fibers colored a first color, second fibers of a different type from the first fibers and colored a second color different from the first color, and third fibers of the same type as the first fibers and colored a third color different from the first color;

an adhesive application process of applying an adhesive having thermosetting properties to the fibrous material generated in the fibrous material generation process to generate a fibrous material mixture;

a molding process of molding the fibrous material mixture into a board shape to produce a molded fibrous material mixture; and a pressing-heating process of pressing and heating the molded fibrous material mixture to produce the recycled board, wherein the first fibers, the second fibers, and the third fibers are exposed on a surface of the recycled board, without the surface being coated with a binder, so that a texture of the fibers is expressed on the surface of the recycled board.

2. The recycled board manufacturing method of claim 1, wherein the fibrous material is generated in the fibrous material generation process by grinding the recovered goods so as to obtain an average fiber length no less than 0.5 mm and no greater than 10 mm.

3. The recycled board manufacturing method of claim 1, wherein:

the recovered goods are leather containing fibers of leather; and a recycled board including the fibers of leather as the fibrous material is manufactured.

4. The recycled board manufacturing method of claim 1, wherein:

the recovered goods are textiles; and a recycled board containing natural fibers and synthetic fibers as the fibrous material is manufactured.

5. The recycled board manufacturing method of claim 4, wherein a recycled board having a contained mass of the synthetic fibers that is greater than a contained mass of the natural fibers is manufactured.

6. The recycled board manufacturing method of claim 4, wherein a recycled board having a contained mass of the natural fibers that is greater than a contained mass of the synthetic fibers is manufactured.

7. The recycled board manufacturing method of claim 1, wherein:

the manufacturing method further comprises a blending process of blending other fibers with the fibrous material generated in the fibrous material generation process; and the adhesive application process includes applying the adhesive having thermosetting properties to the fibrous material blended with the other fibers in the blending process.

8. The recycled board manufacturing method of claim 1, wherein, in the fibrous material generation process, the fibrous material is generated in a state in which the first fibers, the second fibers, and the third fibers are blended by grinding plural recovered goods containing different types of fibers all together.

* * * * *